United States Patent
Charintranond et al.

(10) Patent No.: US 12,455,267 B2
(45) Date of Patent: Oct. 28, 2025

(54) DEF QUALITY SENSOR INTEGRATED INTO A DEF TANK WITH REPLACEABLE CONTROL CIRCUITRY

(71) Applicant: International Engine Intellectual Property Company, LLC, Lisle, IL (US)

(72) Inventors: Paul Boon Charintranond, Palatine, IL (US); Navtej Singh, Arlington Heights, IL (US); John Anthony Williams, Palatine, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 309 days.

(21) Appl. No.: 18/105,965

(22) Filed: Feb. 6, 2023

(65) Prior Publication Data
US 2024/0264134 A1    Aug. 8, 2024

(51) Int. Cl.
*G01N 33/00* (2006.01)
(52) U.S. Cl.
CPC .................. *G01N 33/00* (2013.01)
(58) Field of Classification Search
CPC ........................................ G01N 33/00
USPC ........................................... 73/61.41
See application file for complete search history.

(56) References Cited

U.S. PATENT DOCUMENTS

| | | | |
|---|---|---|---|
| 7,665,347 B2* | 2/2010 | Sasanuma | G01N 25/20 73/61.46 |
| 2015/0226595 A1* | 8/2015 | Reimer | G01F 23/2965 73/64.53 |
| 2016/0011036 A1* | 1/2016 | Wiersma | G01F 23/296 73/290 V |
| 2020/0182833 A1 | 6/2020 | Rudolf et al. | |

FOREIGN PATENT DOCUMENTS

| DE | 10 2009 029 378 A1 | 3/2011 |
| DE | 10 2010 024 554 A1 | 12/2011 |
| DE | 10 2012 020 039 A1 | 4/2014 |

OTHER PUBLICATIONS

Office Action for German Patent Application No. 10 2024 100 653.6, dated Jul. 10, 2024 (16 pages).

* cited by examiner

Primary Examiner — Nathaniel T Woodward
(74) Attorney, Agent, or Firm — Umang Khanna

(57) ABSTRACT

A DEF quality sensor integrated into a DEF tank with removable control circuitry preferably includes a housing and control circuitry. The housing preferably includes a base housing portion and a detachable cover. A sensor opening is formed through a bottom of the DEF tank to receive an outside perimeter of the base housing portion. The base housing portion is sealed to the DEF tank with any suitable sealant. Most of the base housing portion is located inside the DEF tank. The detachable cover is located outside the DEF tank. The detachable cover includes the control circuitry. The detachable cover may be secured to a bottom of the base housing portion with any suitable attachment device (Continued)

or method. The improved removable DEF quality sensor includes the benefits of decreased replacement part storage capacity for parts supplies as well as improved ease of serviceability for repair.

3 Claims, 1 Drawing Sheet

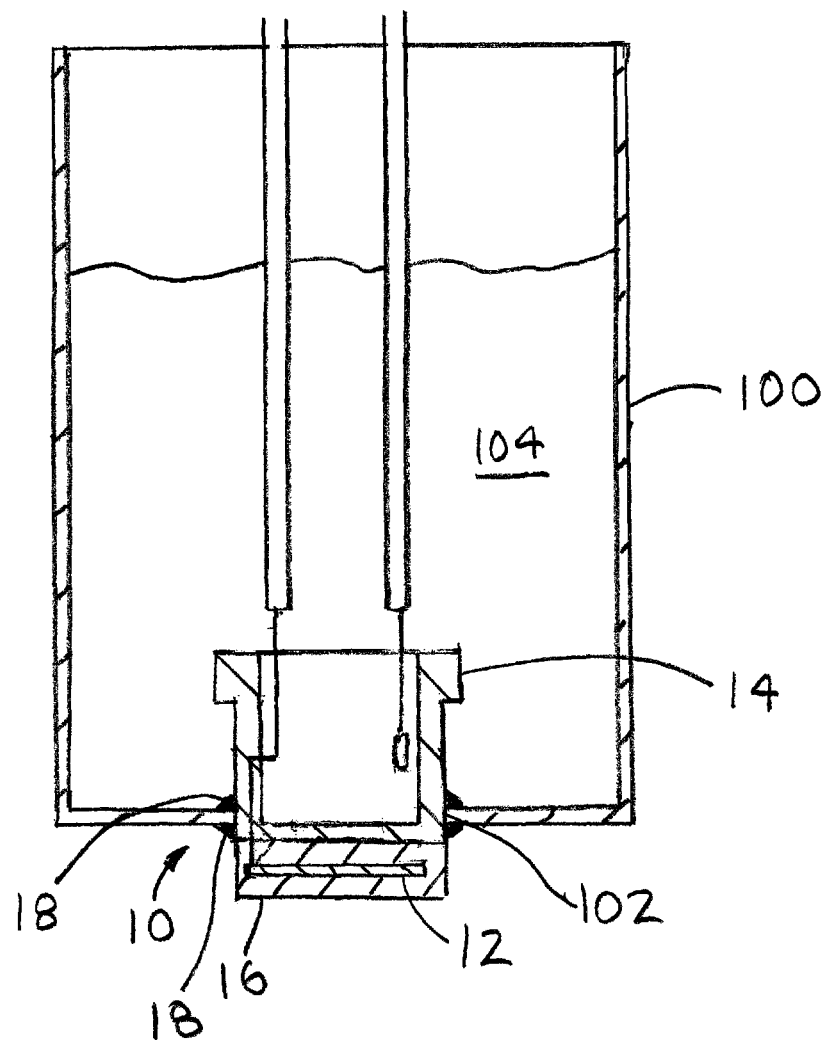

DEF QUALITY SENSOR INTEGRATED INTO A DEF TANK WITH REPLACEABLE CONTROL CIRCUITRY

FIELD OF THE INVENTION

The present invention pertains to integrating a diesel exhaust fluid (DEF) quality sensor into a bottom of a DEF tank, the DEF quality sensor also having replaceable control electronics.

RELATED ART

The prior art discloses submerging a DEF quality sensor in the DEF liquid of a DEF Tank. The DEF quality sensor determines quality, temperature and level of the DEF in the DEF tank. In current DEF tank applications, the DEF quality sensor is integrated into the tank, where only half of the sensor is exposed to the diesel exhaust fluid. Having the DEF sensor integrated into the tank protects the DEF sensor from the ingress of the DEF liquid or constituents of the DEF liquid. Integration of the DEF sensor into the DEF tank also protects the DEF sensor from thermal exposure. However, if the DEF sensor fails, the entire DEF tank must be replaced. The replacement means that a parts supplier must have enough storage space for the entire DEF tank. It would be advantageous for the DEF sensor that is submerged in the DEF tank to have a replaceable DEF head, which would be a much smaller part than the entire DEF sensor. The replaceable DEF head would be replaced, if a failure occurs. However, a replaceable DEF head would come at the cost of robustness of the sensor due to exposure of the DEF sensor control electronics to diesel exhaust fluid and other constituents in the diesel exhaust fluid.

Accordingly, there is a clearly felt need in the art for a DEF quality sensor integrated into a DEF tank with removable control circuitry, which does not submerge the control electronics in the diesel exhaust fluid, but allows replacement of the control electronics from outside the DEF tank.

SUMMARY

The present disclosure is a DEF quality sensor integrated into a DEF tank with removable control circuitry, which allows replacement of the control electronics from outside the DEF tank.

The DEF quality sensor integrated into a DEF tank with removable control circuitry (improved removable DEF quality sensor) preferably includes a housing and control circuitry (or control electronics). The housing preferably includes a base housing portion and a detachable cover. A sensor opening is formed through a bottom of the DEF tank wall to receive an outside perimeter of the base housing portion. The base housing portion is sealed to the DEF tank with any suitable sealant. Most of the base housing portion is located inside the DEF tank. However, a small portion of a bottom of the base housing portion is located outside the DEF tank. The detachable cover is located outside the DEF tank. The detachable cover includes the control electronics. The detachable cover may be secured to the base housing portion with any suitable attachment device or method, such as fasteners or snap clips. A half portion of an ultrasound speed detector will be located inside the DEF tank. The remainder of the ultrasound speed detector will be located outside the DEF tank. The improved removable DEF quality sensor includes the benefits of decreased replacement part storage capacity for parts supplies as well as improved ease of serviceability for repair.

DESCRIPTION OF THE DRAWINGS

FIG. 1 is a cross sectional view of an improved removable DEF quality sensor retained in a DEF tank in accordance with the present invention.

DETAILED DESCRIPTION

With reference now to the drawings, and particularly to FIG. 1, there is shown an improved removable DEF quality sensor 1. The improved removable DEF quality sensor 1 preferably includes a housing 10 and control electronics 12. The housing 10 preferably includes a base housing portion 14 and a detachable cover 16. A sensor opening 102 is formed through a bottom of the DEF tank 100 to receive an outside perimeter of the base housing portion 14. The base housing portion 14 is sealed to the DEF tank with any suitable sealant 18. The sealant 18 is applied to at least one side of a wall of the DEF tank 100. The sealant 18 must be resistant to diesel exhaust fluid 104, ammonia and any other constituents from chemical reactions related to the breakdown of urea. Most of the base housing portion 14 is located inside the DEF tank 100 and a small portion of a bottom of the base housing portion 14 extends outside a bottom of the DEF tank 100. The detachable cover 16 is located outside the DEF tank 100. The control electronics 12 is located in the detachable cover 16.

The control electronics 12 preferably includes a thermistor, an ultrasonic level piezo sensor and an ultrasonic quality piezo sensor. A half portion of the ultrasound speed detection will be located inside the DEF Tank 100, submerged in fluid, and the remaining portion will be located outside the DEF tank 100. The detachable cover 16 may be secured to the bottom of the base housing portion 14 with any suitable attachment device or method, such as fasteners or snap clips. The improved removable DEF quality sensor 1 includes the benefits of decreased replacement part storage capacity for parts supplies as well as improved ease of serviceability for repair.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. A DEF quality sensor with removable control circuitry retained in a sensor opening at a bottom of a DEF tank, comprising:
   a housing including a base housing portion and a removable cover, an outer perimeter of said base housing portion is retained in the sensor opening;
   wherein a substantial part of the said base housing portion is located inside the DEF tank; and
   said control circuitry is retained in said removable cover outside the DEF tank, said removable cover is selectively detachable from said base housing portion.

2. A DEF quality sensor with removable control circuitry retained in a sensor opening at a bottom of a DEF tank, comprising:

a housing including a base housing portion and a removable cover, an outer perimeter of said base housing portion is retained in the sensor opening;

a sealant is applied to said outer perimeter of said base housing portion and said DEF tank; and said control circuitry is retained outside the DEF tank in said removable cover, said removable cover is selectively detachable from said housing.

3. The DEF quality sensor with removable control circuitry of claim 2 wherein:

said sealant is resistant to diesel exhaust fluid, ammonia and any other constituents from chemical reactions related to the breakdown of urea.

\* \* \* \* \*